March 27, 1962  B. H. YORK  3,026,920
SCREWDRIVER
Filed March 4, 1960  2 Sheets-Sheet 1
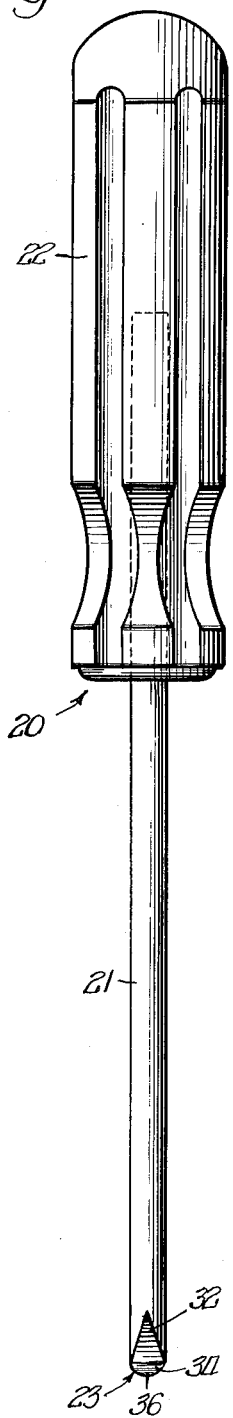
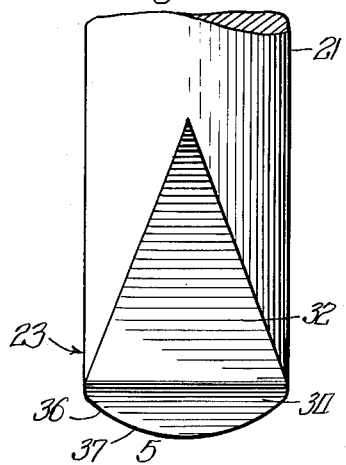
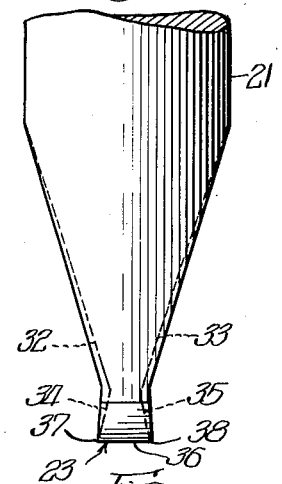
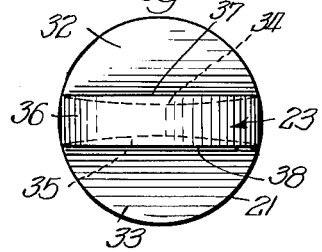
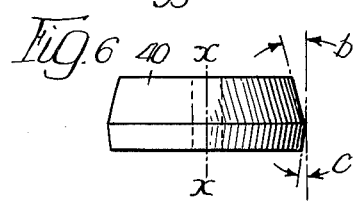
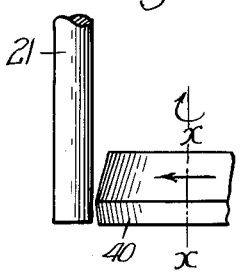
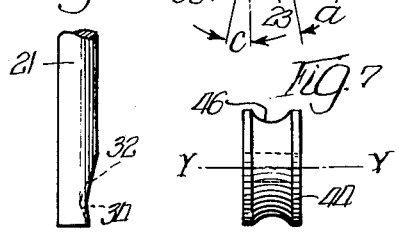
INVENTOR.
Bernard H. York,
BY
Cromwell, Greist & Warden March 27, 1962 B. H. YORK 3,026,920
SCREWDRIVER
Filed March 4, 1960 2 Sheets-Sheet 2
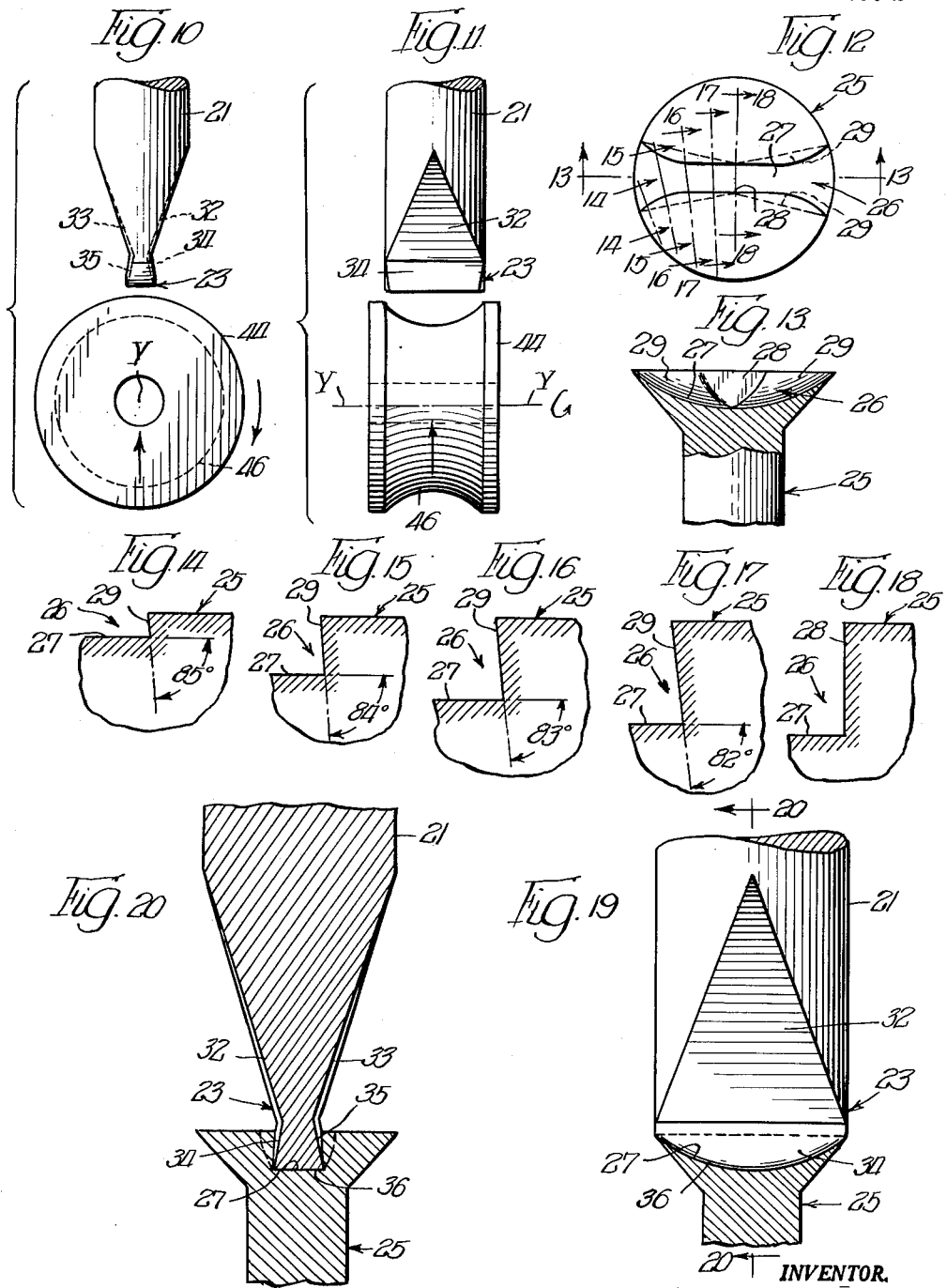
INVENTOR.
Bernard H. York,

United States Patent Office 3,026,920
Patented Mar. 27, 1962

1

3,026,920
SCREWDRIVER
Bernard H. York, Granada Hills, Calif., assignor to Voi-Shan Industries, Inc., Los Angeles, Calif., a corporation of Illinois
Filed Mar. 4, 1960, Ser. No. 12,844
2 Claims. (Cl. 145—50)

The present invention relates to an improvement in screwdrivers which are intended for use with screws or other fasteners having undercut driver-receiving recesses formed in the heads thereof. More particularly, the invention relates to a non-planar-face driver for use with fasteners having undercut driver-receiving recesses of the type wherein the bottom surface of the recess is arcuate and wherein portions of the bearing walls of the recess diverge outwardly from the center thereof and are non-planar with the non-planar faces of the driver being oriented differently than the non-planar portions of the bearing walls of the recess whereby the faces of the driver and the bearing walls of the recess do not normally complement each other.

Undercut driver-receiving recesses of the type described are disclosed in Vaughn Patent No. 2,677,985 and Wing et al. Patent No. 2,792,039. The Wing et al. patent and a related Vaughn Patent No. 2,808,087 set forth that the bearing surfaces of the drivers to be used with the described recesses should be complementary. However, it has been found that the use of drivers having bearing surfaces which complement the bearing surfaces of the fastener recesses results in relatively large forces being applied at the outer ends of the fastener recesses upon the initial application of driver torque whereby there is a tendency toward deformation and shearing of the fastener material at these shallow ends.

It is therefore an important object of the present invention to provide a new and improved non-planar-face driver for use with fasteners having undercut driver-receiving recesses of the type wherein portions of the bearing walls of the recesses diverge outwardly from the center thereof and are non-planar, whereby the bearing contact between the non-planar faces of the driver and the non-planar portions of the fastener recesses is initiated at the center of the recess with the area thereof increasing progressively outwardly as the driver torque is increased due to the fact that the non-planar surfaces of the driver and the recesses, respectively, are oriented differently.

A more specific object of the invention is to provide a new and improved non-planar-face driver having faces defining conical surfaces of revolution for use in undercut fastener recesses having non-planar bearing walls defining conical surfaces of revolution wherein the axes of curvature of the conical surfaces of revolution of the recess bearing walls are disposed in a plane which is disposed at right angles to the longitudinal axis of the fastener and wherein the axes of curvature of the conical surfaces of revolution of the driver faces extend parallel to the axis of the driver.

Another object of the invention is to provide a new and improved non-planar-face driver of the character described which permits the application of a relatively high driver torque to undercut recesses of the character described before noticeable recess deformation and failure occur.

A still further object of the invention is to provide a new and improved non-planar-face driver of the character described which can engage the non-planar walls of a recess of the character described with maximum efficiency, yet which can be easily and economically manufactured, dressed or reground with ordinarily available machine shop equipment.

Certain other objects of the invention will, in part, be obvious, and will in part appear hereinafter.

For a more complete understanding of the nature and scope of the invention reference may now be had to the accompanying drawings wherein:

FIG. 1 is a front view of a screwdriver having a driving tip embodying the invention;

FIG. 2 is an enlarged front view of the driving tip of FIG. 1;

FIG. 3 is an end view of the driving tip as viewed in FIG. 2;

FIG. 4 is a side view of the driving tip as viewed in FIG. 2;

FIG. 5 is a sectional view taken generally on the line 5—5 of FIG. 2;

FIGS. 6 and 7 are side elevational views on approximately the same scale as FIG. 1 of two grinding wheels utilized in forming the driving tip of the invention;

FIG. 8 is a fragmentary side elevational view of the grinding wheel of FIG. 6 positioned for performing one grinding operation on a length of round bar stock in the course of forming the driving tip of the invention;

FIG. 9 is a view of the bar stock of FIG. 8 after the first grinding operation has been performed thereon;

FIG. 10 is a view of the grinding wheel of FIG. 7 on enlarged scale positioned to perform its operation on the bar stock of FIGS. 8 and 9 after two operations have been performed on the bar stock by the grinding wheel of FIG. 6;

FIG. 11 is a view taken at right angles to FIG. 10;

FIG. 12 is a top plan view of a commercially available fastener having an undercut driver-receiving recess of the type for which the driving tip shown in FIGS. 1, 2, 3 and 4 is particularly well adapted;

FIG. 13 is a fragmentary vertical section taken generally on the line 13—13 of FIG. 12;

FIGS. 14, 15, 16, 17, and 18 are enlarged fragmentary vertical sections taken respectively on lines 14—14, 15—15, 16—16, 17—17, and 18—18 of FIG. 12 illustrating the variation in the angle between the arcuate bottom and the non-planar bearing walls of the driver-receiving recess of FIGS. 12 and 13 at various positions relative to the center of the fastener recess;

FIG. 19 is a front view of the driving tip in driving engagement in the recess of the fastener shown in FIGS. 12 and 13 with the fastener being shown in vertical section; and FIG. 20 is a vertical section taken generally on the line 20—20 of FIG. 19.

A screwdriver 20 fabricated in accordance with the invention is illustrated in FIG. 1 of the drawings, which driver is provided with a round shank or body portion 21 having a handle 22 secured on one end thereof and a novel driving tip 23 embodying the invention formed on the opposite end thereof. The driving tip 23 which is best illustrated in FIGS. 2–5 has been developed for high torque operation with fasteners having undercut driver-receiving recesses, and particularly for fasteners having undercut driver-receiving recesses of the type illustrated in FIGS. 12–18. The illustrated driver-receiving recess, which is of the type disclosed in Vaughn Patent No. 2,677,985, is formed by means of a rotary cutter having outwardly diverging cutting edges, which cutter, after the recess has been cut to the desired depth, is bodily pivoted, first in one direction and then the other about the longitudinal axis of the fastener, a specified number of degrees whereby to provide the undercut portion of the recess. Driver-receiving recesses formed in this manner are characterized by bearing walls having vertically disposed planar portions at the center of the recesses and non-planar portions which diverge outwardly from the planar surfaces and define conical surfaces of revolution. These conical surfaces of revolution have their axes of curvature located in a plane disposed normally to the longitudinal axis of the fastener.

Referring specifically to FIGS. 12–18, there is shown a flat head screw 25 having an undercut recess 26 of the type described herein formed in the head thereof. The recess 26 is characterized by an arcuate bottom 27, and by bearing side walls each of which includes a central, generally triangularly shaped, vertically disposed planar portion 28 and outwardly diverging portions 29 defining segments of conical surfaces of revolution. The axes of curvature of the conical surfaces of revolution 29, which axes coincide with the different positions of the axis of rotation of the previously mentioned rotary cutter, are located in a plane which is disposed at right angles to the longitudinal axis of the fastener 25. The generating lines of each surface of revolution 29 converge upwardly from the bottom of the recess 26 with the axis of each conical bearing surface defined thereby extending normally through the longitudinal axis of the fastener 25.

As illustrated in FIGS. 14–18, which are enlarged fragmentary vertical sections through the recess 26 at various distances from the center thereof, the angle in the recess 26 between the arcuate bottom 27 and the non-planar portion 29 of each bearing side wall increases in a direction away from the center of the recess 26. For example, assuming that the recess 26 had been formed by a rotary cutter wherein each cutting edge diverged from the vertical at an angle of 10°, the angle in the recess 26 between the arcuate bottom 27 and the non-planar portions 29 of the bearing side walls would increase from 82° to 85°.

The previously mentioned Wing et al. Patent No. 2,792,039 discloses in FIGS. 9 and 10 a driver for fasteners having driver-receiving recesses of the type disclosed in the patent. The driving tip of this driver is provided with diverging non-planar driving surfaces which are described as having contours matching the contours of the non-planar portions of the bearing walls of the recess. Vaughn Patent No. 2,808,087, which issued from a divisional application of the previously mentioned Vaughn Patent No. 2,677,985, discloses a driving tip for the driver wherein it is set forth that the diverging non-planar bearing surfaces of the driving tip should correspond or be complementary to the conical surfaces of revolution of the bearing walls of the recess disclosed in the Vaughn Patent No. 2,677,985. Further, both of these driving tips define sector-like fragments of the blanks from which the rotary cutters used to form the recesses were formed. Thus, the known prior art pertaining to a driving tip for fasteners having undercut recesses of the type disclosed in FIGS. 12–18 of the present application is limited to driving tips having non-planar bearing surfaces which complement the non-planar bearing walls of the associated fastener recess.

It was discovered and then verified by extensive testing, that the use of drivers having non-planar bearing surfaces which match or complement non-planar bearing walls of the recess of the fastener to be driven is unsatisfactory inasmuch as in most instances the maximum forces exerted between the driver and the bearing walls of the recess, upon the initial application of driving torque, occur at the outer ends of the recess where the fastener material is thinnest and thus more easily deformed or sheared off.

With the novel non-planar-face driver 20 illustrated in FIGS. 1–5, this problem has been eliminated inasmuch as the geometry of the driving tip 23 is such that the initial bearing contact between the bearing surfaces of the driving tip 23 and the fastener recess 26 is at the center of the recess 26 with the area of bearing contact therebetween increasing progressively toward the outer ends of the recess 26 as the driver torque is increased. Thus, a substantially greater torque may be safely applied to the recess 26 by the driver disclosed than with the drivers disclosed in either the Wing et al. Patent No. 2,792,039 or the Vaughn Patent No. 2,808,087 without mutilation of the fastener material at the outer ends of the recess 26. This advantageous feature of the driver 20 disclosed herein is due to the new geometry of the driving tip 23 thereof. Any material deformation resulting from use of the driver 20 disclosed herein would occur near the center of the recess 26 at the bottom thereof whereby the upper surface and outer edge of the head of the fastener 25 will remain smooth. Such material deformation is far less objectionable than that which occurs at the outer ends of a fastener recess.

The new and improved geometry of the driving tip 23 of the driver 20 disclosed herein is best illustrated with reference to FIGS. 1–11 wherein the tip 23 is defined by a first pair of conical surfaces of revolution 32 and 33 formed on opposite sides of the shank or body portion 21, which surfaces converge in a direction toward the end of the driving tip 23 and intersect a second pair of conical surfaces of revolution 34 and 35. The conical surfaces of revolution 34 and 35, which form the driving surfaces of the driving tip 23 as illustrated in FIGS. 19 and 20, diverge in a direction toward the end of the driving tip 23 and intersect an arcuate surface 36 formed on the leading end of the driving tip 23. The intersection of the diverging non-planar surfaces 34 and 35 with the arcuate end surface 36 on the driving tip 23 provides a pair of leading edges 37 and 38 which are substantially parallel to each other as will be fully explained herein. When the driving tip 23 is used with fasteners having undercut recesses with arcuate bottoms, it is preferable that the arc of the recess bottom be substantially the same as the arc formed on the leading end of the driving tip 23, as in FIGS. 19 and 20.

Each set of adjacent conical surfaces of revolution 32—34 and 33—35 has the same axis of curvature. These axes of curvature do not pass normally through the longitudinal axis of the shank 21 of the driver 20. Preferably, as illustrated in the drawings, these axes of curvature of the surfaces 32—34 and 33—35 are disposed in parallel relationship to the longitudinal axis of the shank 21 of the driver 20. Thus, the generating lines of each surface of revolution 34 and 35 converge in a direction toward the tip of the driver 20 with the axis of the conical bearing surface defined thereby extending parallel to the longitudinal axis of the driver shank 21. The radii of curvature of the sets of surfaces 32—34 and 33—35 are relatively large so that the leading edges 37 and 38 will be substantially parallel to each other and so that the angle of divergence $a$ (FIG. 5) between the end surface 36 and each surface 34 and 35 will be substantially the same across the length of the driving tip 23.

When the driving tip 23 is initially inserted into an undercut recess such as the recess 26, there will not be full bearing contact between the conical bearing surfaces 34 and 35 of the driving tip 23 and the conical portions 29 of the bearing walls of the recess 26. This feature results from the fact that the angle of divergence $a$ of the driving tip 23 is substantially the same across the length of the driving tip 23 while the angle in the recess 26 between the bottom surface 27 thereof and the non-planar bearing walls 29 increases progressively from the center of the recess toward the outer ends thereof, as previously described herein with reference to FIGS. 14–18. Further, the conical bearing surfaces 34 and 35 of the driving tip 23 are oriented differently than the conical bearing walls 29 of the recess 26 inasmuch as their respective axes of curvature are disposed angularly relative to each other. As before set forth herein, the axes of curvature of the surfaces of revolution 29 of the recess walls are disposed in a plane at right angles to the longitudinal axis of the fastener 25 while the axes of curvature of the surfaces of revolution 34 and 35 of the driving tip 23 are disposed parallel to the longitudinal axis of the driver 20.

While the specific angle of divergence $a$ of the driving tip 23 is optional, depending upon the particular combination of geometry adopted, it should be no larger than the angle existing in the recess 26 in a plane disposed transversely of the recess and parallel to the longitudinal axis of the fastener 25 near the outer end of the recess (see FIG. 14) to insure substantial bearing of the driving surfaces 34 and 35 of the driving tip 23 with the undercut bearing surfaces 29 of the recess as increasing torque is applied. Also, the angle $a$ should be no smaller than the smallest angle existing in the recess 26 near the center thereof (see FIG. 17). It has been found that the preferred angle of divergence $a$ of the driving tip 23 should be just slightly smaller than the angle existing in the recess near the outer end thereof. Thus, for the particular driver-receiving recess 26 illustrated in the drawings, the angle of divergence $a$ of the driving tip 23 should be approximately 84° or 85°.

As a result of the new geometry of the driving tip 23 disclosed herein, the bearing contact between the bearing faces 34 and 35 of the driving tip 23 and the outwardly diverging non-planar portions 29 of the bearing walls of the recess 26 is initiated at the central portion of the recess 26 with the area of contact therebetween increasing progressively toward the periphery of the fastener head or the outer ends of the recess 26 as the driver torque is increased. Thus, there is no bearing contact between the driving tip 23 and the outer ends of the bearing walls of the recess 26 until after a considerable amount of driver torque has been applied. Thus, the tendency toward material deformation and subsequent shearing of the material at the outer ends of the recess 26 is substantially reduced.

Another advantageous feature of the driving tip 23 disclosed herein lies in the ease and economy of both the original fabrication and the redressing of the new geometry on an integral shaft or driving member such as the rod or shank 21. This can be readily accomplished by grinding operations on equipment normally available in a machine shop. The drivers disclosed in the Wing et al. Patent No. 2,792,039 and the Vaughn Patent No. 2,808,087, which have differently oriented non-planar bearing surfaces as previously described herein, must be fabricated either by machining operations which are substantially more complex or by forging operations. Redressing of such drivers by machining operations is considerably more difficult than redressing of the driving tip 23 disclosed herein.

One suitable means for fabricating the driving tip 23 is illustrated in FIGS. 6–11 of the drawings. Referring to FIGS. 6, 8, and 9, a grinding wheel 40, which is rotatable about an axis $x$—$x$, is provided for forming each set of conical bearing surfaces 32—34 and 33—35. The outer circumference of the grinding wheel 40 is provided with a generally V-shaped configuration including an angle $b$ which is chosen to provide the preferred angle of convergence of the conical bearing surfaces 32 and 33 and an angle $c$ which is chosen to provide the preferred angle of divergence of the conical bearing surfaces 34 and 35. With the axis of rotation $x$—$x$ of the grinding wheel 40 disposed parallel to the longitudinal axis of a circular rod or shaft which is to provide the shank 21 of the driver 20 (FIG. 8), the rotating grinding wheel 40 is bodily moved toward the rod whereby to form the conical bearing surfaces 32 and 34, as illustrated in FIG. 9. The rod is then rotated 180° after which the operation is repeated to form the conical bearing surfaces 33 and 35. Obviously, the rod may be moved relative to the rotating grinding wheel 40 should it be preferable to have the axis $x$—$x$ of the wheel remain stationary. Two grinding wheels 40 may be provided so that all four conical bearing surfaces may be formed simultaneously. By providing a large diameter grinding wheel 40, the radii of curvature of the conical bearing surfaces 34 and 35 will be sufficiently large that the leading edges 37 and 38 of the driving tip 23 will be substantially parallel.

To form the arcuate end surface 36, a rotary grinding wheel 44, illustrated in FIGS. 7, 10, and 11, is provided. The grinding wheel 44 is rotatable about an axis $y$—$y$ and is provided on its outer circumference with an annular groove 46 having a radius chosen to form the preferred arcuate end surface 36. The grinding wheel 44 is positioned below the tip of the driver 20 (as viewed in FIGS. 10 and 11) with its axis of rotation $y$—$y$ disposed normally to the longitudinal axis of the rod 21. The rotating grinding wheel 44 is then bodily moved toward the tip of the rod whereby to form the arcuate end surface 36 and complete the fabrication of the driving tip 23. The grinding wheel 44 should have a sufficiently large diameter so that the arcuate end surface 36 of the driving tip 23 will not be grooved or undercut in a direction generally parallel to the leading edges 37 and 38.

By fabricating the driving tip 23 in the manner described herein, a minimum amount of material will be removed from the rod whereby the driver 20 will have optimum performance and strength characteristics.

It will be understood that certain changes may be made in the construction or arrangement of the improved non-planar-face driving tip disclosed herein without departing from the spirit and scope of the invention as defined in the appended claims.

I claim:

1. In a driver for fasteners having undercut driver-receiving recesses of the type wherein portions of the bearing walls of the recesses diverge outwardly from the center thereof and define surfaces of revolution having axes of curvature disposed at right angles to the longitudinal axis of the fastener, a driving tip comprising, a generally convex arcuate leading end surface of uniform width from end to end thereof with the opposite leading side edges thereof being disposed in parallel planes, and a pair of opposite bearing surfaces which diverge toward said arcuate leading end with said bearing surfaces defining generally concave surfaces of revolution having axes of curvature disposed parallel to the longitudinal axis of the driver.

2. In a driver for fasteners having undercut driver-receiving recesses of the type wherein the bottom surfaces of the recesses are concavely arcuate and wherein portions of the bearing walls of the recesses diverge outwardly from the center thereof and define segments of conical surfaces of revolution having axes of curvature disposed at right angles to the longitudinal axis of the fastener whereby the angles between the bottom surface of the recess and the bearing walls increase progressively from the center of the recess toward the outer end of the recess, a driving tip comprising, a generally convex arcuate leading end surface, a pair of opposite bearing surfaces which diverge toward said arcuate leading end surface with said bearing surfaces defining generally concave surfaces of revolution having axes of curvature disposed parallel to the longitudinal axis of the driver, and the opposite arcuate leading side edges of said generally convex leading end surface defined by the intersections of said diverging concave bearing surfaces therewith being disposed in planes which are parallel to each other and to the longitudinal axis of the driver whereby the thickness of said leading end surface is uniform from end to end thereof, the radii of curvature of said generally concave surfaces of revolution of the driving tip being relatively large whereby the angle between the leading end surface and each bearing surface of revolution of the driving tip is substantially the same along the length of the driving tip.

References Cited in the file of this patent

UNITED STATES PATENTS

| | | |
|---|---|---|
| 1,899,489 | Wickbergh | Feb. 28, 1933 |
| 1,997,422 | Lorenzen et al. | Apr. 9, 1935 |
| 2,808,087 | Vaughn | Oct. 1, 1957 |

FOREIGN PATENTS

| | | |
|---|---|---|
| 10,115 | Great Britain | Apr. 29, 1912 |